United States Patent [19]
Hayashi et al.

[11] Patent Number: 5,445,853
[45] Date of Patent: Aug. 29, 1995

[54] OPTICAL DATA STORAGE MEDIA

[75] Inventors: Yoko Hayashi; Shin-Ichiro Tamura, both of Kanagawa; Takao Murooka; Yoshitake Yanagisawa, both of Shizuoka, all of Japan

[73] Assignee: Sony Corporation, Tokyo, Japan

[21] Appl. No.: 2,410

[22] Filed: Jan. 8, 1993

[30] Foreign Application Priority Data

Jan. 9, 1992 [JP] Japan ................... 4-002441
Jun. 29, 1992 [JP] Japan ................... 4-170977
Oct. 9, 1992 [JP] Japan ................... 4-296623

[51] Int. Cl.$^6$ ............................... B23B 3/00
[52] U.S. Cl. .......................... 428/64.4; 428/913; 430/270; 430/945; 340/135.1
[58] Field of Search ................... 428/64, 65, 913; 430/270, 945; 346/76 L, 135.1

[56] References Cited

U.S. PATENT DOCUMENTS

| | | | |
|---|---|---|---|
| 4,873,131 | 10/1989 | Kashima et al. | 428/64 |
| 4,996,089 | 2/1991 | Saito et al. | 428/64 |
| 5,002,812 | 3/1991 | Umehara et al. | 428/64 |
| 5,080,946 | 1/1992 | Takagisi et al. | 428/64 |

FOREIGN PATENT DOCUMENTS 0291848 11/1988 European Pat. Off. .
0514211 11/1992 European Pat. Off. .

OTHER PUBLICATIONS

Patent Abstracts of Japan, vol. 16, No. 96 (P-1322), Mar. 10, 1992 & Jp-A-32 76 008, Dec. 6, 1991.
Patent Abstracts of Japan, vol. 9, No. 170 (P-373, Jul. 16, 1985 & JP-A-60 047 247, Mar. 14, 1985.

*Primary Examiner*—Patrick J. Ryan
*Assistant Examiner*—Elizabeth Evans

[57] ABSTRACT

The present invention is directed to an optical data storage medium in which a reflecting layer is formed on a substrate. A dye containing layer having a reflectivity of 15 to 25% is used as the reflecting layer, and a signal modulation degree of an information signal falls within a range of from 0.3 to 0.6. Further, a real number portion n of complex index of refraction of the reflecting layer is selected so as to satisfy $n \geq 1.84$.

According to the present invention, there is provided an optical data storage medium which can be reproduced by a recording and reproducing apparatus which is designed so as to record and reproduce a medium such as a magneto-optical disc or the like having a reflectivity of about 15 to 25%. Therefore, the recording and reproducing apparatus that can record and reproduce the medium having the reflecting layer whose reflectivity is low can be made small in size and light in weight.

9 Claims, 9 Drawing Sheets

OPTICAL DATA STORAGE MEDIA

BACKGROUND OF THE INVENTION

1. Field of the Invention

The present invention relates to an optical information recording medium which can be recorded and/or reproduced by a magneto-optical recording apparatus.

2. Description of the Prior Art

Optical data storage media such as a compact disc (CD), a laser disc (LD) or the like are now commercially available on the market. Each of these optical data storage media comprises a substrate on which concavities and convexities corresponding to information signals are previously formed, a reflecting layer formed on the substrate and a protecting layer formed on the reflecting layer, if necessary. This type of optical data storage medium is a playback type optical disc from which an information signal previously recorded can be reproduced only. The above reflecting layer is made of a material such as Al, Au or the like having a high reflectivity, i.e., low absorptance.

Recently, as an optical data storage medium in which information can be written and erased unlike the optical information media such as the CD or the like, the development of a magneto-optical disc has been promoted. This magneto-optical disc comprises a substrate and a recording portion formed on the substrate by laminating a recording magnetic layer (e.g., a rare earth-transition metal alloy amorphous thin film such as TbFeCo or the like) having a magnetization easy axis vertical to the film surface and which has a large magneto-optical effect, a reflecting layer and a dielectric layer. As such magneto-optical disc, a magneto-optical disc (so-called mini-disc) having a diameter of 64 mm has already been manufactured as popular magneto-optical discs.

If the above-mentioned playback optical disc can be reproduced by the magneto-optical disc recording and reproducing apparatus, then the playback optical disc and the magneto-optical disc system will become more widespread and useful in actual practice. The playback optical disc whose reflecting layer is made of a material Al, Au or the like, however, has a reflectivity of 70% or more relative to a laser light, which reflectivity is very high as compared with the magneto-optical disc whose reflectivity lies in a range of from 15 to 25%. Also, since the playback optical disc has a different signal modulation degree from that of the magneto-optical disc, the playback optical disc cannot be reproduced by the recording and reproducing apparatus which can record and reproduce the magneto-optical disc. If two kinds of amplifiers are mounted within the above recording and reproducing apparatus, then a signal can, of course, be reproduced from the playback optical disc. In this case, the circuit arrangement of the recording and reproducing apparatus becomes complicated, which is not to be practical.

OBJECTS AND SUMMARY OF THE INVENTION

Therefore, it is a general object of the present invention to provide an improved optical data storage medium in which the aforesaid shortcomings and disadvantages encountered with the prior art can be eliminated.

It is an object of the present invention to provide an optical data storage medium which can be reproduced by a recording and reproducing apparatus which can record and reproduce a medium such as a magneto-optical disc or the like having a reflectivity of about 15 to 25%.

It is another object of the present invention to provide an optical data storage medium by which a recording and reproducing apparatus that can record and reproduce a medium having a low reflectivity reflecting layer can be made small in size and light in weight.

According to a first aspect of the present invention, there is provided an optical data storage medium which comprises a substrate on which a concavity and a convexity corresponding to an information signal are formed and a reflecting layer formed on the substrate. The reflecting layer is a dye containing layer having a reflectivity of 15 to 25%. A signal modulation degree of the information signal recorded by forming the concavity and convexity is set in a range of from 0.3 to 0.6.

According to a second aspect of the present invention, there is provided an optical data storage medium in which a reflecting layer on which an information signal is recorded is formed on a substrate. The reflecting layer is a dye containing layer having a reflectivity of 15 to 25% and a signal modulation degree of an information signal to be recorded lies in a range of from 0.3 to 0.6.

According to the present invention, there is provided an optical data storage medium which can be reproduced by a recording and reproducing apparatus which can reproduce a medium such as a magneto-optical disc or the like having a reflectivity of about 15 to 25%. Therefore, the recording and reproducing apparatus which can record and reproduce the medium having the reflecting layer whose reflectivity is low can be made small in size and light in weight.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

The present invention will now be described with reference to the drawings.

In view of the aforesaid aspect, the present invention is to provide an optical data storage medium which can be reproduced by a recording and reproducing apparatus which can record and reproduce a medium such as a magneto-optical disc or the like having a reflectivity of about 15 to 25%. Further, the present invention is intended to provide a small and light-weighted recording and reproducing apparatus which can record and reproduce such a medium having a low reflectivity reflecting layer.

To achieve the above-mentioned objects, the optical data storage medium of the present invention comprises a substrate on which a concavity and a convexity corresponding to an information signal are formed and a reflecting layer formed on the substrate. In this case, the above reflecting layer is a dye containing layer having a reflectivity of 15 to 25% and the signal modulation degree of an information signal recorded by forming the concavity and convexity lies in a range of from 0.3 to 0.6.

Further, in an optical data storage medium in which a reflecting layer on which an information signal is recorded is formed on a substrate, the above reflecting layer is a dye containing layer having a reflectivity of 15 to 25% and the signal modulation degree of an information signal to be recorded lies in a range of from 0.3 to 0.6.

Furthermore, a real number portion n of a complex index of refraction of the reflecting layer is selected so as to satisfy $n \geq 1.84$.

The dye containing layer contains dyes of two kinds of more.

Further, the dye contained in the dye containing layer is cyanine dye and the counter-ion of the cyanine dye is an ion having an ionic radius of 0.294 nm or more.

Furthermore, the counter-ion of cyanine dye is any one of ions expressed by the following chemical formulas (5), (6), (7) and (8).

Chemical formula (5)

Chemical formula (6)

Chemical formula (7)

Chemical formula (8)

Further, an optical phase difference $\Delta S$ between the concave and convex portions on the reflecting layer obtained by the following equation (2) satisfies $0.21 \leq S \leq 0.94$ $$\Delta S = 2d_{sub}[n_{sub} - n_{abs}(1 - d_{abs}/d_{sub})]/\lambda \qquad (2)$$

where $d_{sub}$: distance between an interface of a substrate corresponding to the concave portion and a light reflecting layer and an interface of the substrate and the light reflecting layer corresponding to the surrounding of the concave portion;

$d_{abs}$: distance between an interface of a light reflecting layer corresponding to the concave portion and air and an interface of the light reflecting layer and air corresponding to the surrounding of the concave portion;

$n_{sub}$: real number portion of complex index of refraction of the substrate;

$n_{abs}$: real number portion of complex index of refraction of the light reflecting layer; and $\lambda$: wavelength of a reproduced light Furthermore, a whole thickness of the optical data storage medium lies in a range of from 1.2 $\pm$0.2 mm.

Figure 1:
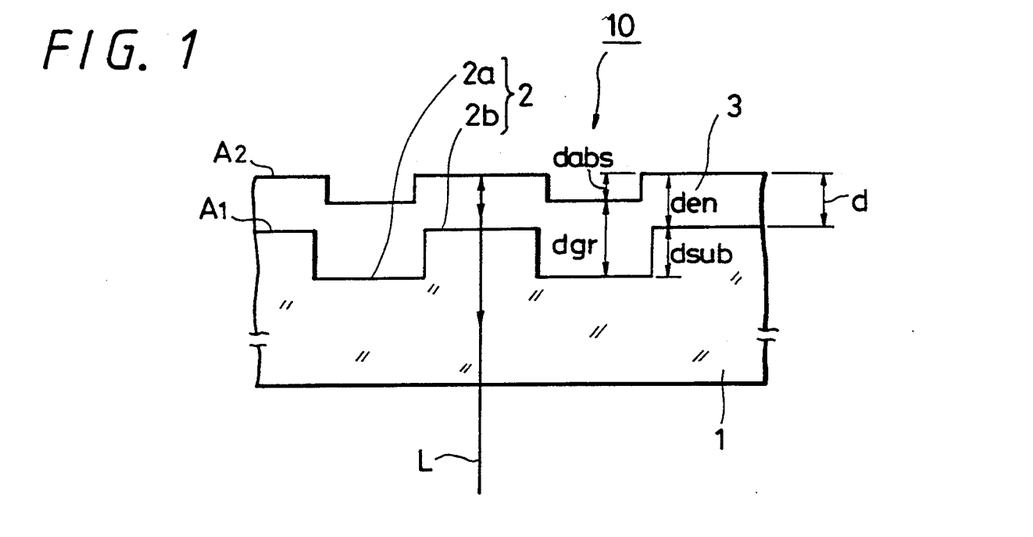
FIG. 1 is a fragmentary cross-sectional view showing an example of a structure of an optical data storage medium according to the present invention.

The optical data storage medium to which the present invention is applied comprises a substrate 1 on which a concave-shaped pit portion 2a and a convex-shaped land portion 2b corresponding to an information signal, a guide groove and an address code pit are formed and a reflecting layer 3 formed on the substrate 1 as shown in FIG. 1 of the accompanying drawings. From such optical data storage medium, an information is read out by observing a difference between reflected light amounts of the pit portion 2a and the land portion 2b obtained when a laser light is radiated on the reflecting layer 3 from the substrate 1 side.

According to the present invention, in order that such optical data storage medium becomes able to be reproduced by a recording and reproducing apparatus which can record and reproduce a medium such as a magneto-optical disc having a reflectivity of 15 to 25%, a dye containing layer is employed as the reflecting layer 3.

By adjusting a film thickness d, an optical constant or the like of the dye containing layer, a reflectivity of the dye containing layer falls within 15 to 25% which is a reproduced light reflectivity range of the above-mentioned recording and reproducing apparatus. Accordingly, if such dye containing layer is utilized as the reflecting layer 3, then the above objects can be achieved.

Of the dye containing layers, it is preferable that a dye containing layer in which a real number portion n of complex index of refraction is 1.84 or more is utilized. A reflectivity of the dye containing layer in which the real number portion n of complex index of refraction is 1.84 or more can be set in a range of from 15 to 25% only by adjusting the film thickness d. Therefore, reflecting layer forming conditions thereof can be set with ease.

The above dye containing layer is composed of a dye and a polymer material, for example. In this case, the real number portion n of complex index of refraction thereof can be adjusted to be a desired value by controlling a mixing ratio of the dye and the polymer material.

As the dye contained in the dye containing layer, any of organic and inorganic dyes may be used so long as the real number portion n of complex index of refraction thereof becomes more than 1.84 when it is used to form the dye containing layer. By way of example, as the organic dye, there may be enumerated cyanine dyes expressed in the following chemical formulas (9) and (10), etc. As the cyanine dye expressed in the chemical formula (9), there are known NK529, Nk3750, NK2670 and NK3751 (trade names and manufactured by NIHON KANKOSHIKISO CO., LTD.). As the cyanine dye expressed in the chemical formula (10), there are known SCR (trade name and manufactured by SONY CORP.) and so on. When the cyanine dye is utilized, it is preferable that the cyanine dye having a counter-ion with an ionic radius of 0.294 nm or more, e.g., $PF_6^-$, $[C_6F_5]_4B^-$, $[C_6H_{11}Ph]_4B^-$, $[TRPPh]_4B^-$ or the like is utilized because such dye has an excellent conservative stability.

Chemical formula (9)

where $X^-$ is any one of $I^-$, $BF_4^-$, $ClO_4^-$, $PF_6^-$, $[C_6F_5]_4B^-$, $[C_6H_{11}Ph]_4B^-$, $[TRPPh]_4B^-$.

Chemical formula (10)

If more than two kinds of dyes are contained in the dye containing layer, then a fluctuation of a reflectivity dependent on the wavelength of the radiated light can be suppressed in the vicinity of, particularly, a wavelength (780 nm) of a reproduced light. Hence, a reproduced signal is stabilized.

More specifically, the dye containing layer has a feature such that the reflectivity thereof is fluctuated depending on the wavelength of the radiated light. Although the reproducing laser light is generally set about wavelength 780 nm, it is fluctuated in a range of ±10 nm. Therefore, when the reflectivity is considerably fluctuated near the wavelength of 780 nm depending on the wavelength of the radiated light onto the dye containing layer, the reflectivity is fluctuated upon reproduction and the reproduced signal becomes unstable. If more than two kinds of dyes are contained in the dye containing layer, the fluctuation of the reflectivity dependent on the wavelength of the radiated light is decreased and a fluctuation of reflectivity caused by the fluctuation of the wavelength of the reproducing laser light can be suppressed.

In the above dye containing layer, it is desirable that the polymer material is selected in consideration of a solubility with dyes. When the above organic dye, for example, is utilized as the dye, polyvinyl butyral or the like is utilized.

An additive may be added to the dye containing layer in order to protected the dye from a discoloration. As the additive, there may be utilized materials such as amine or the like having an electron-donating property and materials such as nickel complex or the like having an energy level lower than that of the excited state of the dye.

The optical data storage medium may become applicable to the magneto-optical disc recording and reproducing apparatus by providing the above reflecting layer from a reflectivity standpoint. If the optical data storage medium becomes able to be reproduced by the above recording and reproducing apparatus, it becomes important that a difference amount between the amounts of reflected light from the pit portion and the land portion, i.e., signal modulation degree can be applied to the recording and reproducing apparatus together with the reflectivity.

More specifically, the signal modulation degree mentioned herein is a ratio $I_{11}/I_{ATOP}$ of a reflected light amount $I_{TOP}$ on the land portion and the reflected light amount $I_{11}$ on the pit portion having the maximum length. By way of example, of the magneto-optical discs, the signal modulation degree $I_{11}/I_{TOP}$ of the so-called mini-disc falls in a range of from 0.3 to 0.6. In order that the optical data storage medium becomes able to be reproduced by the recording and reproducing apparatus which is designed so as to record and reproduce a medium having such signal modulation degree, it becomes necessary that the signal modulation degree $I_{11}/I_{TOP}$ falls in a range of from 0.3 to 0.6 similarly as described above.

Therefore, in order that the optical recording medium of the present invention may be reproduced by the recording and reproducing apparatus which is designed so as to record and reproduce, in particular, the mini-disc of the magneto-optical discs, the reflectivity is selected in a range of from 15 to 25% and the signal modulation degree is selected in a range of from 0.3 to 0.6.

Conditions that the signal modulation degree $I_{11}/I_{TOP}$ is adjusted to fall in a range of from 0.3 to 0.6 will be described below.

In the above optical information recording medium, the signal modulation degree $I_{11}/I_{TOP}$ is determined by the optical phase difference $\Delta S$ between lights reflected on the reflecting layers on the pit portion 2a and the land portion 2b when a laser light L is radiated from the substrate 1 side. The signal modulation degree $I_{11}/I_{TOP}$ falls within a range of from 0.3 to 0.6 when the optical phase difference $\Delta S$ falls in a range of from 0.21 to 0.94.

The optical phase difference $\Delta S$ that determines the signal modulation degree is determined by a distance $d_{sub}$ between a first interface $A_1$ corresponding to the pit portion 2a and the first interface $A_1$ corresponding to the land portion 2b and a distance $s_{abs}$ between a second interface $A_2$ corresponding to the pit portion 2a and the second interface $A_2$ corresponding to the land portion 2b when the first interface $A_1$ assumes an interface between the substrate 1 and the light reflecting layer 3 and also the second interface $A_2$ assumes an interface between the light reflecting layer 3 and air, a real number portion $n_{sub}$ of complex index of refraction of the substrate 1 and a real number portion $n_{abs}$ of complex index of refraction of the light reflecting layer 3. The authentic relation equations will be described below.

An optical distance up to the second interface $A_2$ obtained when the first interface $A_1$ in the pit portion 2a in the land portion 2a is taken as a standard is expressed as:

$$N_{sub} \cdot d_{sub} + n_{abs} \cdot d_{Ln} \quad (3)$$

where $n_{sub}$: real number portion of complex index of refraction of the substrate;

$d_{sub}$: distance between the first interface in the pit portion and the first interface in the land portion;

$n_{abs}$: real number portion of complex index of refraction of the reflecting layer; and $d_{Ln}$: film thickness of the light reflecting layer in the land portion.

Further, an optical distance up to the second interface when the first interface $A_1$ in the pit portion 2a in the pit portion 2a is taken as a standard is expressed as:

$$n_{abs} \cdot d_{gr} \quad (4)$$

$n_{abs}$: real number portion of complex index of refraction of the reflecting layer; and $d_{gr}$: film thickness of the light reflecting layer in the pit portion.

Accordingly, from the equations (3) and (4), an optical distance difference ND between the pit portion and the land portion is expressed as:

$$ND = (n_{sub} \cdot d_{sub} + n_{abs} \cdot d_{Ln}) - n_{abs} \cdot d_{gr} \quad (5)$$

where $d_{gr} + d_{abs} = d_{Ln} + d_{sub}$.

This equation of $d_{gr} + d_{abs} = d_{Ln} + d_{sub}$ is substituted as:

$$d_{gr} - d_{Ln} = d_{sub} - d_{abs} \quad (6)$$

By using the equation (6), the equation (5) for calculating the optical distance difference ND can be substituted as:

$$ND = n_{sub} \cdot d_{sub} - n_{sub}(d_{sub} - d_{abs}) \quad (7)$$

The optical phase difference $\Delta s$ between the lights reflected on the reflecting layer 3 on the pit portion 2a and the land portion 2b obtained after the laser light was radiated from the substrate 1 side is expressed as:

$$\Delta S = 2ND/\lambda \quad (8)$$

This equation (8) is substituted as follows by using the equation (7) which is used to calculate the optical distance difference ND:

$$\Delta S = 2d_{sub}[n_{sub} - n_{abs}(1 - d_{abs}/d_{sub})]/\lambda \quad (9)$$

From the equation (9), it is to be understood that the optical phase difference $\Delta S$ is determined based on $n_{sub}$, $n_{abs}$, $d_{sub}$ and $d_{abs}$.

Accordingly, in order that the signal modulation degree may fall in a range of from 0.3 to 0.6, $n_{sub}$, $n_{abs}$, $d_{sub}$ and $d_{abs}$ are set so as to make the optical phase difference $\Delta S$ fall in a range of from 0.21 to 0.94, and a depth of the pit portion 2a, the film thickness of the light reflecting layer 3, etc., are adjusted in accordance with the set values. Thus, the reflectivity and the signal modulation degree both become adaptable to the mini-disc recording and reproducing apparatus.

The optical data storage medium thus arranged can also be applied a writable optical data storage medium in which an information signal is written by the radiation of a laser light on a reflecting layer. In this case, however, information pits are not formed on the substrate and only guide grooves and address code pits are formed on the substrate.

When the optical data storage medium is utilized as the writable optical data storage medium, if a laser light is radiated on the reflecting layer, the dye contained in the reflecting layer absorbs the laser light and generates a heat, whereby the reflecting layer is partly and thermally expanded to form an expanded portion that becomes a pit. Also, when the pit is formed as described above, the reflectivity of the reflecting layer lies in a range of from 15 to 25% so that the information can be read out from the medium by the magneto-optical disc recording and reproducing apparatus.

Further, the thus arranged writable optical data storage medium has a proper reflectivity and is thin as compared with a conventional writable optical data storage medium. Therefore, the thickness of the above writable optical data storage medium can be reduced to about 1.2 mm, which is the standardized thickness of the mini-disc, for example. From this standpoint, the writable optical data storage medium can be more widespread and become to be more practical.

Figure 13:
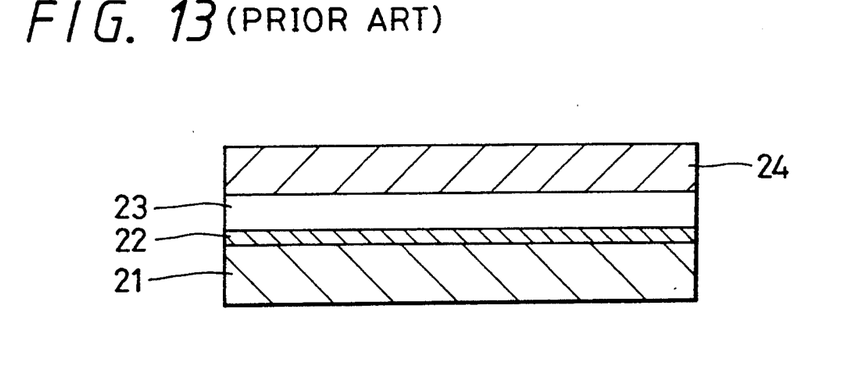
FIG. 13 is a fragmentary cross-sectional view showing an example of a structure of a conventional optical data storage medium.

FIG. 13 of the accompanying drawings shows a structure of a conventional writable optical data storage medium.

As shown in FIG. 13, the conventional writable optical data storage medium comprises a substrate 21, a dye layer 22 formed of only a dye and a protecting layer 24 formed on the dye layer 22 through an air layer 23. Pits are formed by partly removing the dye by the radiation of a laser light on the dye layer 22.

In the above conventional optical data storage medium, thicknesses of the respective layers are, for example, such that the thickness of the substrate 21 is 1.0 mm, the thickness of the dye layer 22 is 40 nm, the thickness of the air layer 23 is 0.5 mm and the thickness of the protecting cover 24 is 1.0 mm, respectively. In this case, the whole thickness of this optical data storage medium becomes 2.5 mm or thicker. Even in such optical data storage medium, if the respective layers are formed as thin films, then the whole thickness of the optical data storage medium can be reduced to a certain extent. However, since the air layer 23 must be formed, there is a limit that the whole thickness is reduced. As a consequence, the whole thickness of this optical data storage medium cannot be substantially matched with the standardized thickness, 1.2 mm of the so-called mini-disc.

A fundamental structure of the optical data storage medium according to the present invention has been described so far. When the optical data storage medium of the present invention is utilized as any of the playback and writable optical information media, a protecting layer that protects the reflecting layer 3 may be formed on the reflecting layer 3. The above protecting layer may be made of a material such as a fluororesin, a silicone resin or the like.

In the optical data storage medium in which the reflecting layer is formed on the substrate on which a concave portion and a convex portion corresponding to the information signal are formed, if the dye containing layer having a reflectivity of 15 to 25% is employed as the reflecting layer, the optical data storage medium becomes able to be reproduced by the recording and reproducing apparatus which can record and reproduce the medium such as the magneto-optical disc having the reflectivity of 15 to 25%.

In particular, if the dye containing layer in which the real number portion n of complex index of refraction is 1.84 or more is utilized, then the reflectivity of the dye containing layer can fall within the above range only by controlling the film thickness thereof. Therefore, the reflecting layer forming conditions can be set with ease.

Further, if the cyanine dye having the counter-ion whose ionic radius is more than 0.294 is utilized as the dye contained in the dye containing layer, then the optical data storage medium becomes excellent in conservative stability.

Furthermore, if two or more kinds of dyes are contained in the above reflecting layer, then the reflectivity fluctuation dependent on the wavelength of the radiated light can be suppressed so that the reproduced signal becomes stable. The reason for this is considered such that, if two or more kinds of dyes are contained in the reflecting layer, then the dyes can cancel the reflectivity fluctuation dependent on the wavelength of the radiated light each other out.

In addition, if the signal modulation degree is set in a range of from 0.3 to 0.6, then the above optical data storage medium becomes able to be reproduced by the mini-disc recording and reproducing apparatus.

The signal modulation degree is determined by the optical phase difference $\Delta S$ between lights reflected on the reflecting layer on the pit portion and the land portion when the laser light is radiated from the substrate side. The signal modulation degree $I_{11}/I_{TOP}$ falls in a range of from 0.3 to 0.6 when this optical phase difference $\Delta S$ is set in a range of from 0.21 to 0.94.

The optical data storage medium thus arranged is not limited to the CD-type optical data storage medium in which the information signal is written in advance on the surface of the substrate and may be utilized as the writable optical data storage medium in which the information is written by the radiation of the laser light on the reflecting layer. The writable optical data storage medium thus arranged is thin in thickness as compared with the conventional optical data storage medium. Therefore, there is then the advantage such that the thickness thereof is matched with the standardized thickness, i.e., about 1.2 mm of the above-mentioned mini-disc.

A practical embodiment of the present invention will hereinafter be described with reference to experimental results.

Dyes, binders and additives utilized when the optical data storage medium according to this embodiment is manufactured are as follows:

Dye A: NK529 (trade name, manufactured by NIHON KANKOSHIKISO CO., LTD.)

Dye B: SRC-8 (trade name, manufactured by SONY CORP.)

Binder: polyvinyl acetacetal, e.g., PVB-2000AS (material C) trade name, manufactured by DENKI KAGAKU KOGYO K.K.)

Additive: Amine compound (manufactured by NIPPON KAYAKU CO., LTD., under the trade name of IRG003) (material D)

Solvent: hydroxy methylbutanone (manufactured by TOKYO KASEI KOGYO K.K) (material E)

A chemical formula of the material D is expressed in the following chemical formula (11):

Chemical formula (11)

EXPERIMENT EXAMPLE 1

In this experimental example, the experiment was carried out when the present invention was applied to the playback optical disc in which a reflecting layer was formed on a substrate in which pit portions and land portion corresponding to an information signal, guide grooves and address code pits were formed in advance. Each reflectivity measured in the following experiments was the reflectivity of light reflected on the reflecting layer when the laser light was radiated from the substrate side.

(1) Examination of reflectivity characteristic of optical data storage medium

The dyes A, B and the materials C, D, E were mixed with the following composition ratio to produce a dye containing composition.

$$(A+B+C):D:E=3:0.2:100$$

The composition ratio of the dyes A, B and the material C was changed as shown on the following table 1.

Then, this dye containing composition was coated on a polycarbonate substrate by a so-called spin-coat method to form a reflecting layer and to thereby produce optical information media (samples 1 to 5).

Real number portions of complex index of refraction and reflectivities of the thus made optical information media are also illustrated on the following table 1. Further, with respect to these samples 1 to 5, measured results of the reflectivities relative to the real number portion n of complex index of refraction are shown in FIG. 2.

TABLE 1

| | COMPOSITION (COMPOSITION RATIO) | OPTICAL CONSTANT n | REFLECTIVITY (%) |
| --- | --- | --- | --- |
| TEST SAMPLE 1 | CONTAINING ONLY DYE A | 2.87 | 40 |
| TEST SAMPLE 2 | DYE A:MATERIAL C = 1:1 | 2.50 | 30 |
| TEST SAMPLE 3 | DYE A:DYE B:MATERIAL C = 1:1:1 | 2.48 | 26 |
| TEST SAMPLE 4 | DYE B:MATERIAL C = 3:1 | 2.20 | 25 |
| TEST SAMPLE 5 | DYE B:MATERIAL C = 1:1 | 1.95 | 17 |

Figure 2:
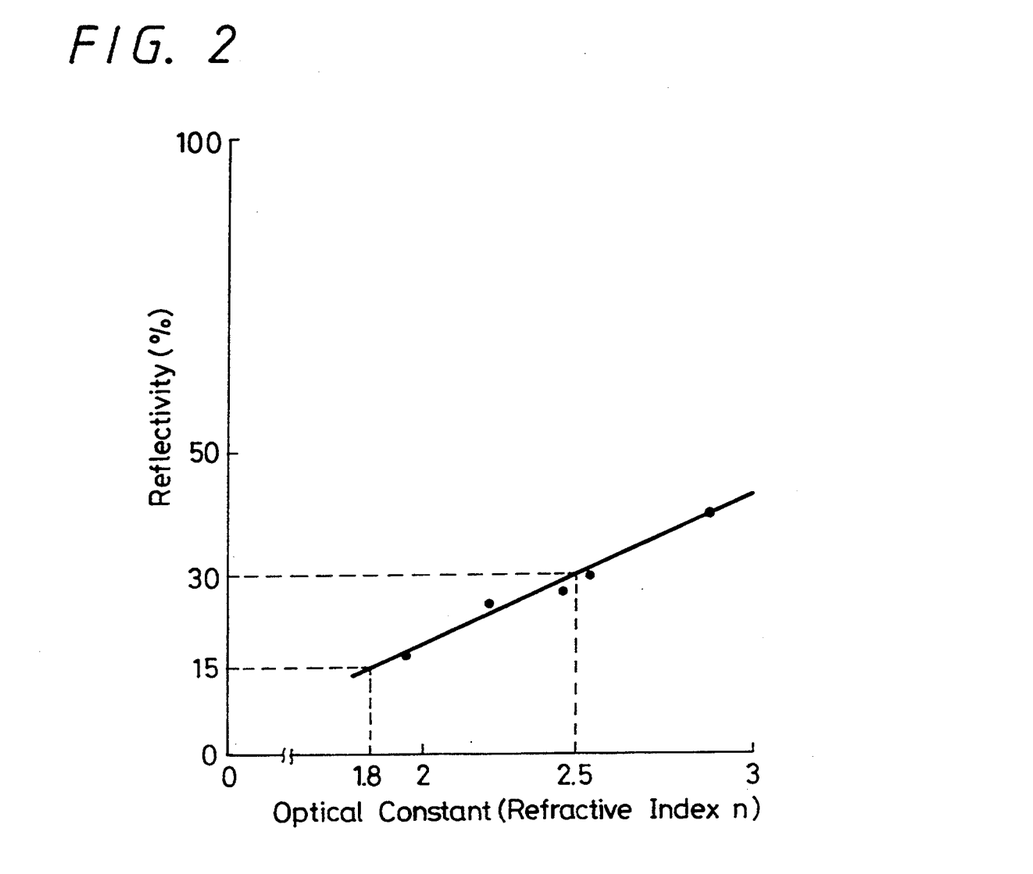
FIG. 2 is a characteristic graph showing a relationship between a real number portion n of a complex index of refraction and a reflectivity of the optical data storage medium.

As will be clear from FIG. 2, the real number portion n of complex index of refraction and the reflectivity are set in substantially proportional relationship. Study of FIG. 2 reveals that, when the film thickness is selected to be 100 nm, then if the real number portion n of complex index of refraction is set in a range of from 1.8 to 2.3, then the reflectivity is set in a range of from 15 to 25%.

Figure 3:
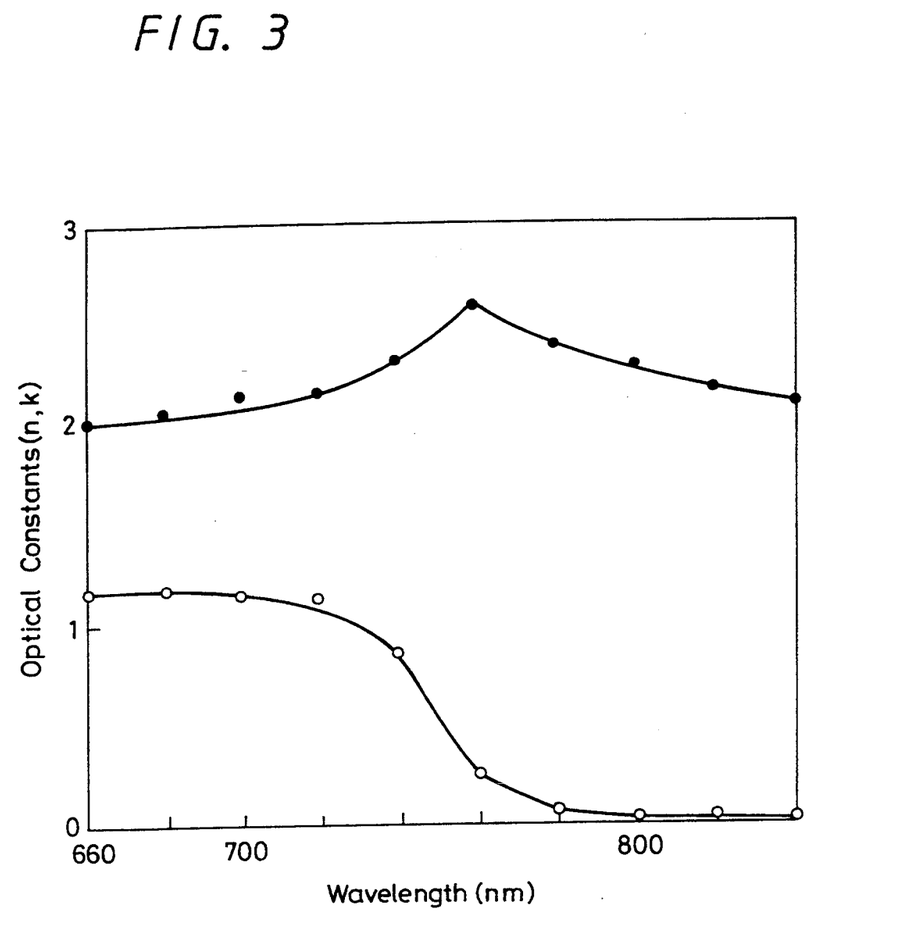
FIG. 3 is a characteristic graph showing a wavelength dispersion of real number portions n and k of a complex index of refraction of the reflecting layer of the optical data storage medium.

For reference, a wavelength dispersion of an optical constant, i.e., refractive index and an extinction coefficient was measured in the surface of the optical data storage medium 10 on which the recording was not effected, i.e., mirror surface. In FIG. 3, a solid line shows the change of the refractive index n and a solid line shows the change of the extinction coefficient k.

Figure 4:
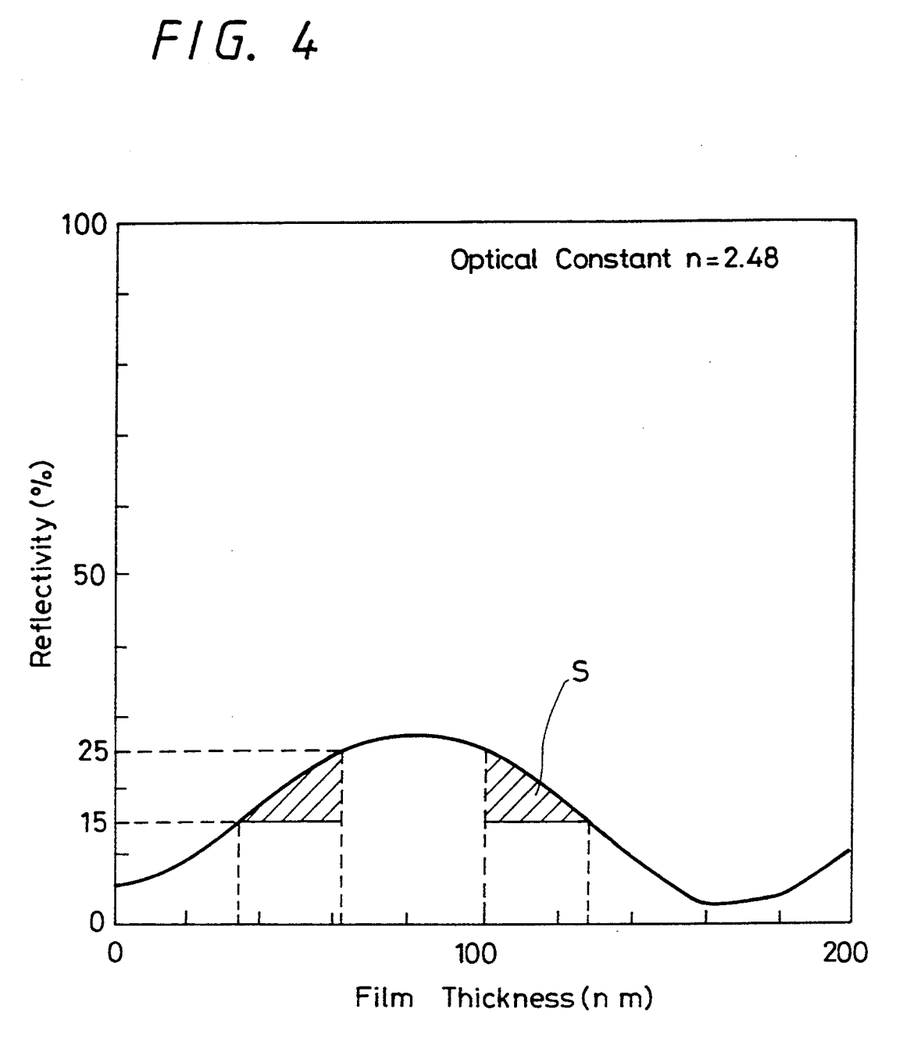
FIG. 4 is a characteristic graph showing a film thickness dependency of a reflectivity obtained when the real number portion n of the complex index of refraction is 2.48 in the reflecting layer.

FIG. 4 shows measured results of the range of film thickness where a reflectivity falls within a range of from 15 to 25% when the real number portion n of complex index of refraction of the reflecting layer 3 was 2.48 and the wavelength λ of the reproduced light was 780 nm in the example of the optical data storage medium 10. In FIG. 4, a hatched area S shows the range where the reflectivity falls within the range of from 15 to 25%. In this case, the film thickness d was set in a range of from about 30 to 60 nm and about 100 to 130 nm.

Then, by adjusting the compositions of the dyes in the reflecting layer, the film thickness dependency of the reflectivity was measured under the condition that the real number portion n of complex index of refraction becomes 1.84 and 2.87. Measured results are illustrated in FIGS. 5 and 6.

Figure 5:
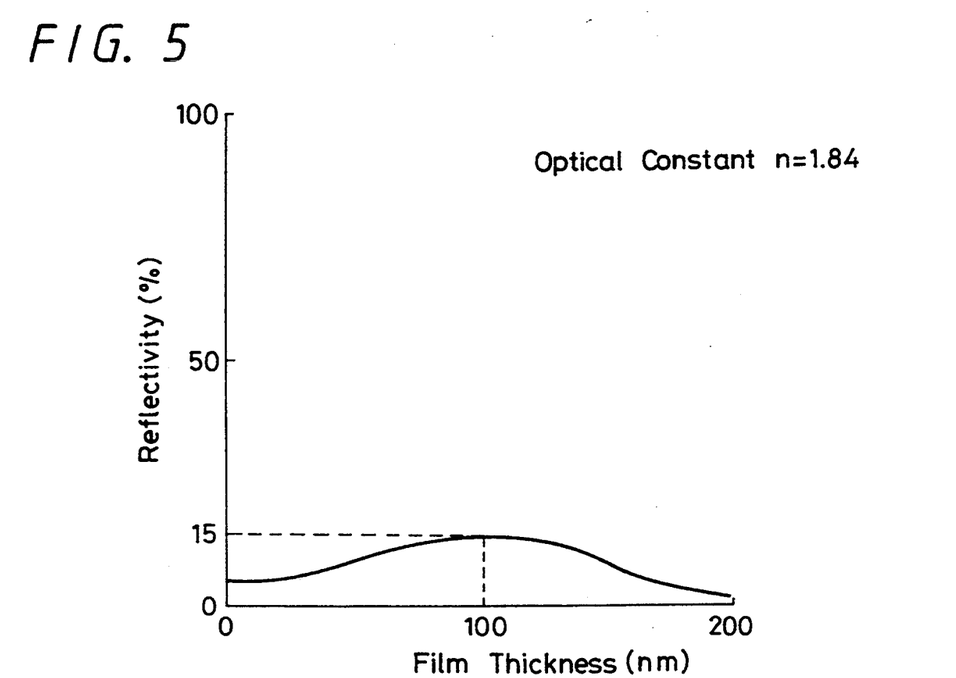
FIG. 5 is a characteristic graph showing a film thickness dependency of a reflectivity obtained when the real number portion n of the complex index of refraction is 1.84 in the reflecting layer.

FIG. 5 shows the film thickness dependency of the reflectivity of the reflecting layer 3 when the real number portion n of complex index of refraction was 1.84. Study of measured results of FIG. 5 reveals that the reflectivity of 15% was only just obtained when the film thickness was selected to be 100 nm.

Figure 6:
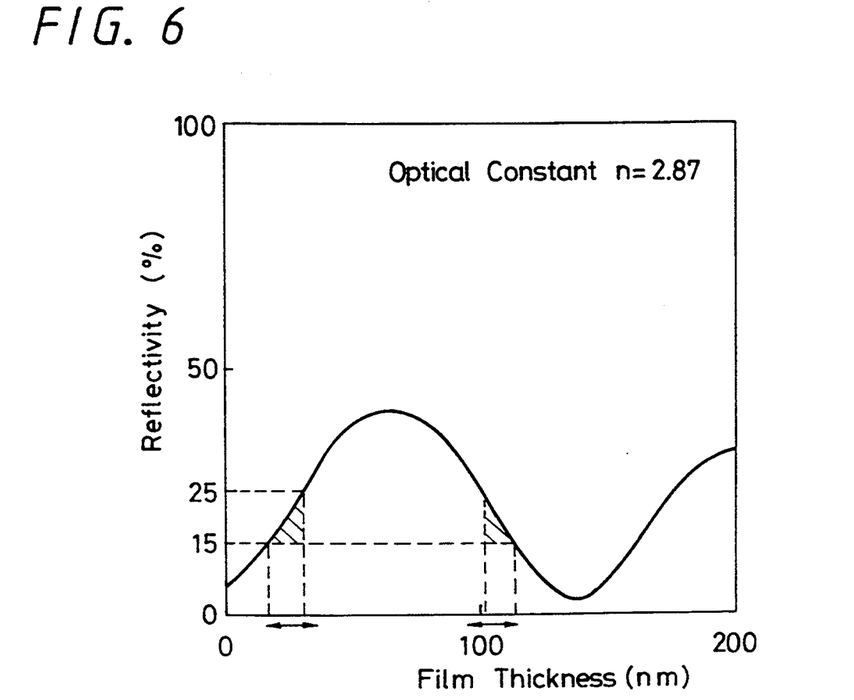
FIG. 6 is a characteristic graph showing a film thickness dependency of a reflectivity obtained when the real number portion n of the complex index of refraction is 2.87 in the reflecting layer.

Study of measured results of FIG. 6 reveals that the reflectivity of 15 to 25% was obtained when the real number n of complex index of refraction was 2.87 and the film thickness was about 20 to 30 nm and about 100 to 110 nm.

From the above-mentioned results, it is to be understood that, when the real number portion n of complex index of refraction was selected to be 1.84 or more and the film thickness of the reflecting layer was selected properly, the reflectivity of the reflecting layer could be made more than 15% and less than 25% reliably.

Then, with respect to an optical data storage medium in which the composition ratio of dyes A and B in the reflecting layer is selected 1:1, an optical data storage medium in which only the dye A is contained in the reflecting layer, an optical data storage medium in which only the dye B is contained in the reflecting layer, an optical data storage medium in which the dye A:the dye B is 2:1 and an optical data storage medium in which the dye A:the dye B is 1:2, the wavelength dependency of the reflectivity was measured in the portion where the information signal was not recorded, i.e., mirror surface by a spectrophotometer (manufactured by HITACHI LTD., under the trade name of U3210). FIGS. 7 to 11 show measured results.

Figure 7:
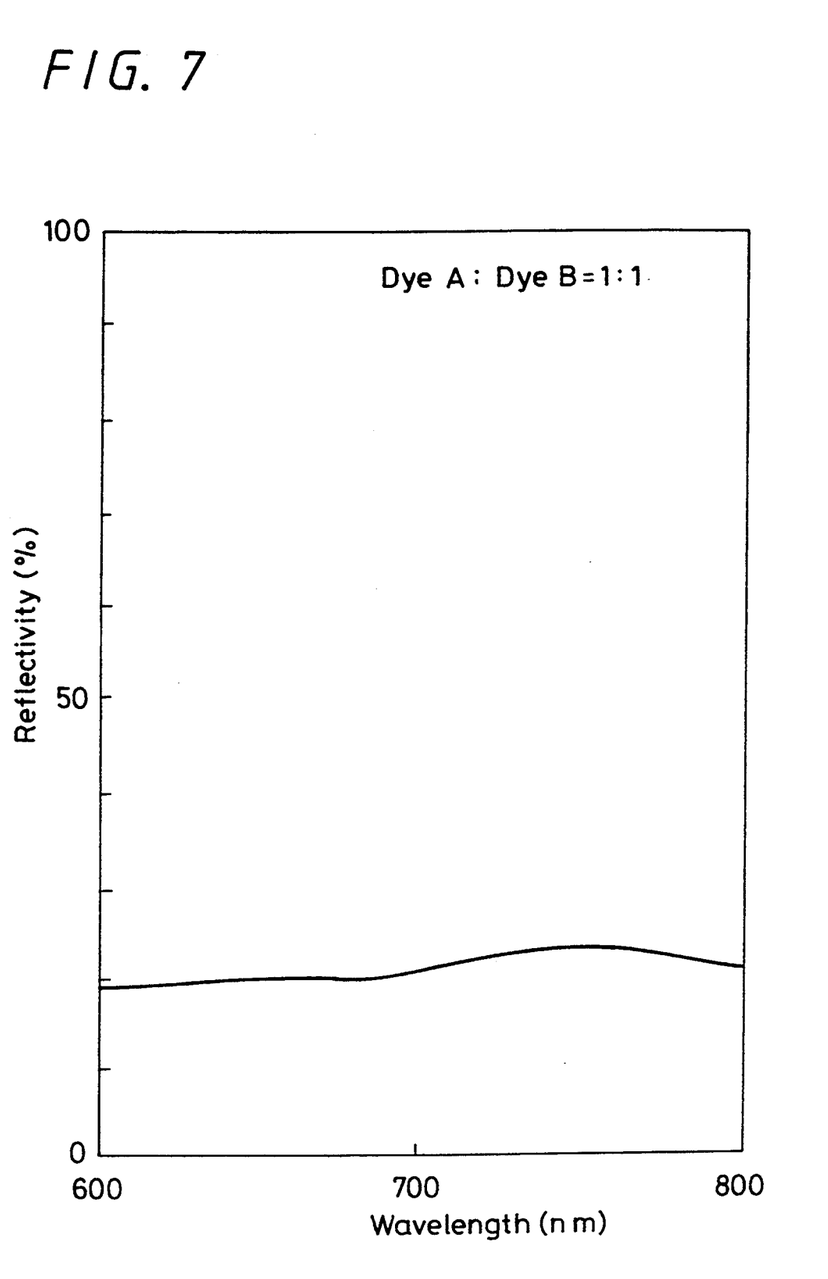
FIG. 7 is a characteristic graph showing a relationship between a wavelength of a radiated light and a reflectivity obtained when a composition ratio of dye of dye A:dye B is 1:1 in the reflecting layer.
Figure 8:
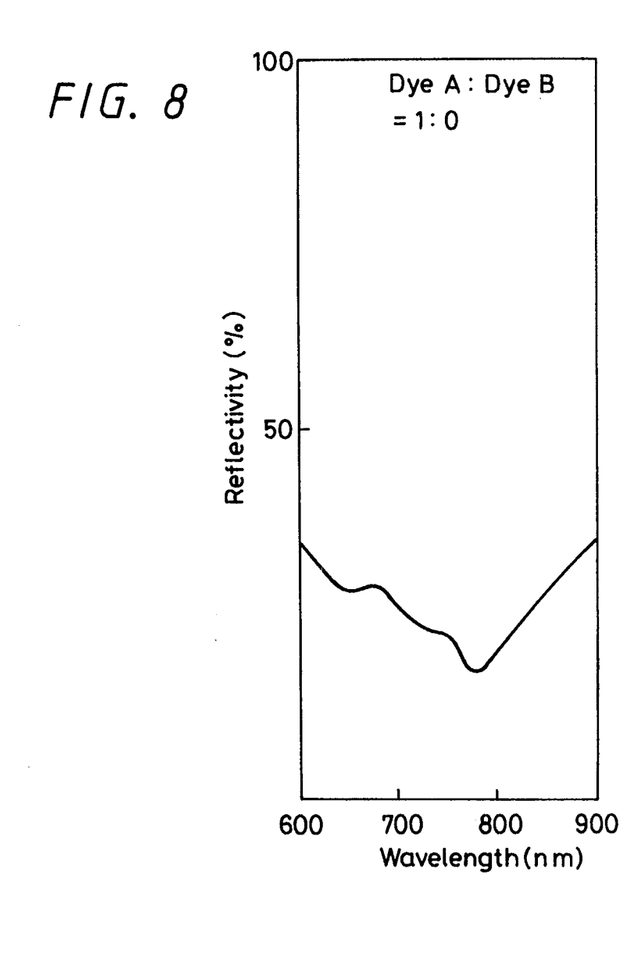
FIG. 8 is a characteristic graph showing a relationship between a wavelength of a radiated light and a reflectivity obtained when a composition ratio of dye of dye A:dye B is 1:0 in the reflecting layer.
Figure 9:
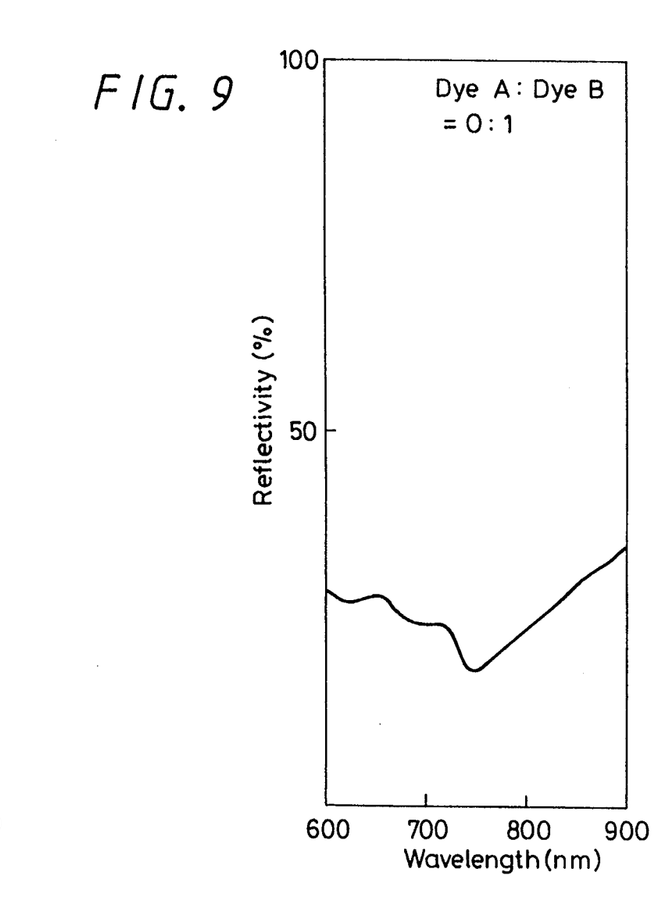
FIG. 9 is a characteristic graph showing a relationship between a wavelength of a radiated light and a reflectivity obtained when a composition ratio of dye of dye A:dye B is 0:1 in the reflecting layer.
Figure 10:
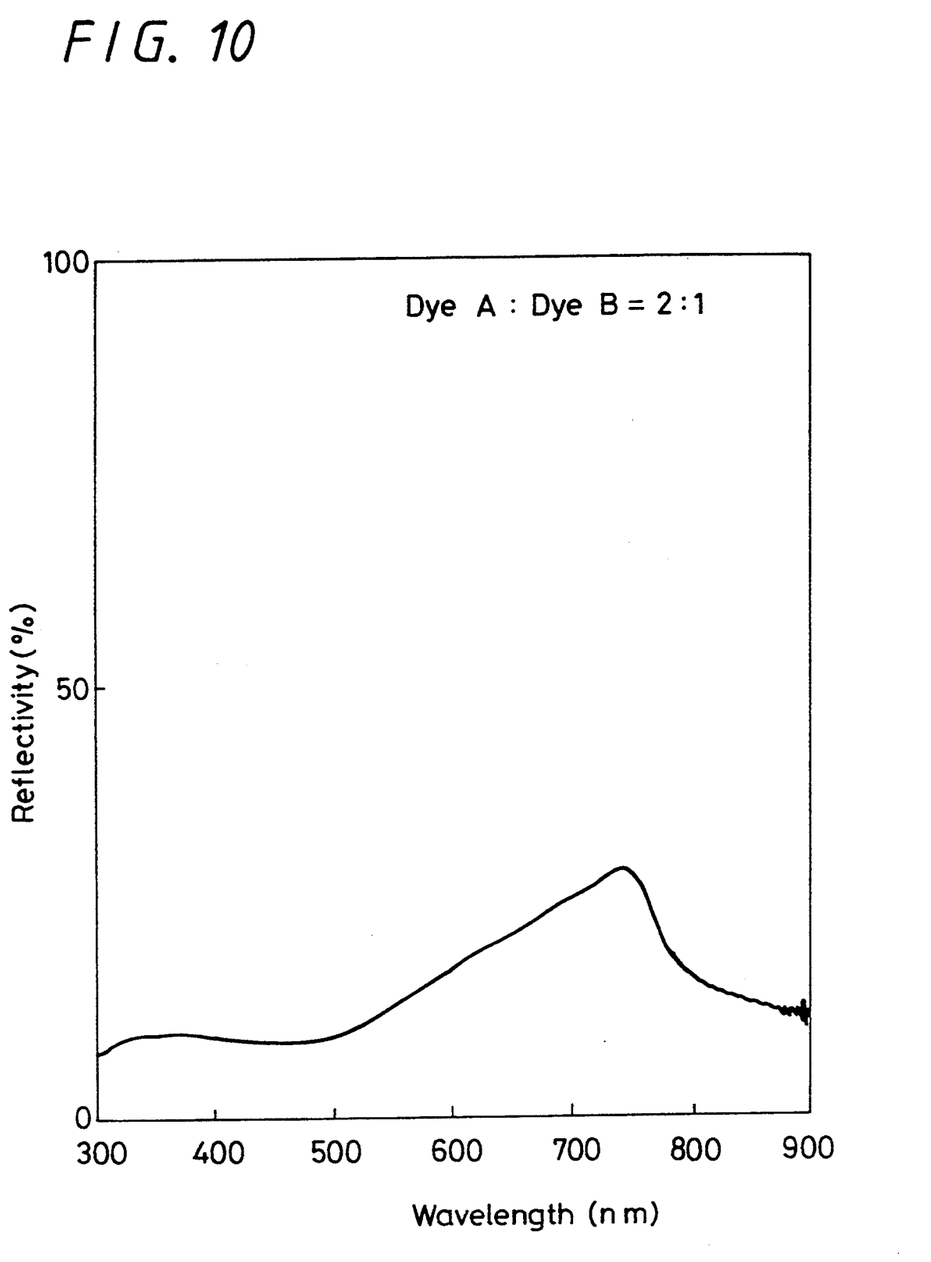
FIG. 10 is a characteristic graph showing a relationship between a wavelength of a radiated light and a reflectivity obtained when a composition ratio of dye of dye A:dye B is 2:1 in the reflecting layer.
Figure 11:
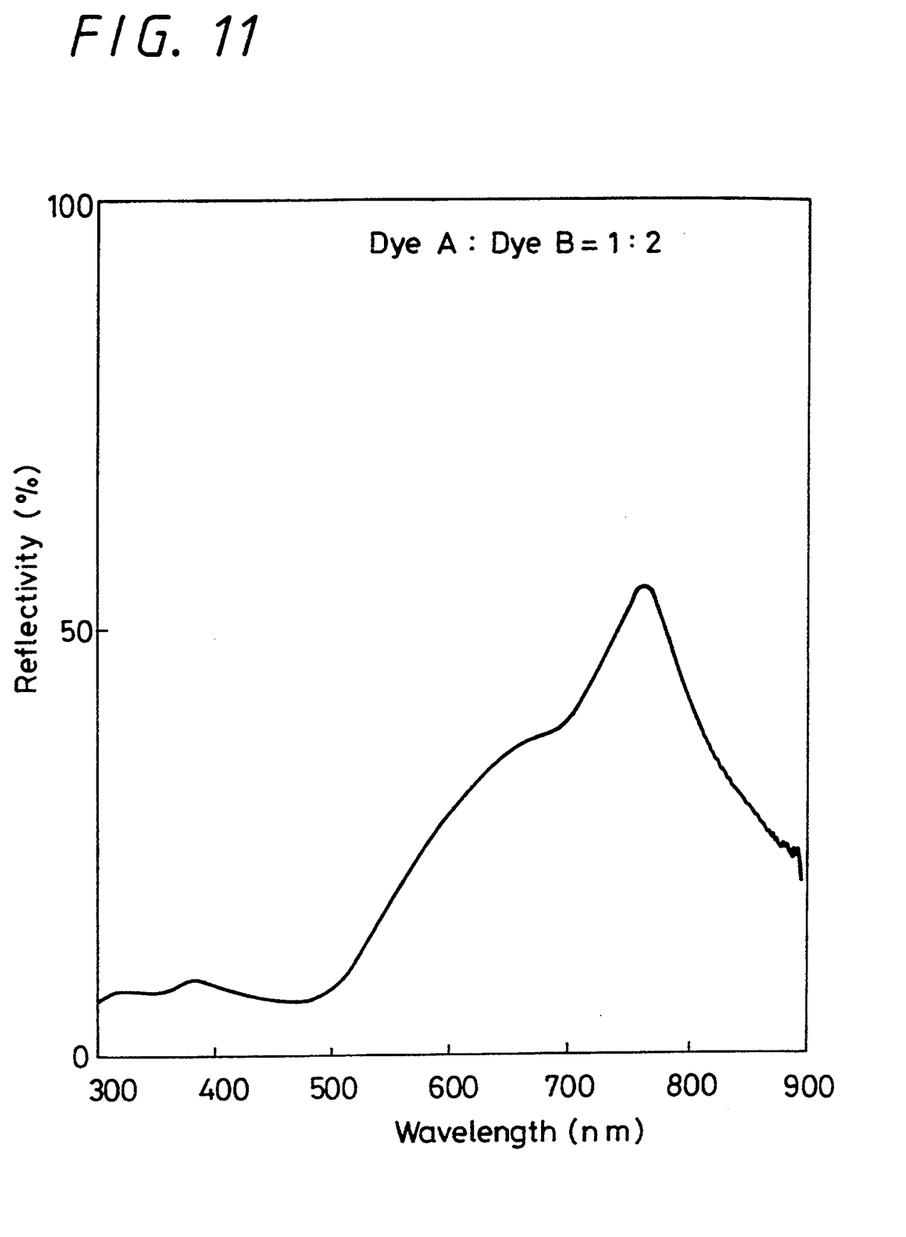
FIG. 11 is a characteristic graph showing a relationship between a wavelength of a radiated light and a reflectivity obtained when a composition ratio of dye of dye A:dye B is 1:2 in the reflecting layer.

Study of measured results of FIG. 7 reveals that the optical data storage medium in which the reflecting layer contains the dyes A and B with the composition ratio of 1:1 has a small wavelength dependency of reflectivity and a constant reflectivity of about 25% in the range of from 780 ±10 nm which is the wavelength of the reproduced light.

Study of measured results of FIGS. 8 to 11 reveals that other optical information media have a wavelength dependency of reflectivity and the reflectivity changed rapidly in the vicinity of 780 ±10 nm which is the current wavelength of the reproduced light.

Therefore, from the above measured results, it becomes clear that, when a plurality of dyes are contained in the reflecting layer with a proper composition ratio, it becomes possible to obtain the optical data storage medium in which the wavelength dependency of reflectivity can be eliminated and which can produce a more stable reproduced signal.

(2) Examination of signal modulation degree of optical data storage medium

A 1.2 mm-thick polycarbonate substrate in which pit portions were formed at the track pitch of 1.6 μm was manufactured by an injection molding process. Dimensions of pit portions are illustrated on the table 2 below.

TABLE 2

| | WIDTH OF PIT PORTION (μm) | DEPTH OF PIT PORTION (nm) |
| --- | --- | --- |
| TEST SAMPLE 6 | 0.5 | 200 |
| TEST SAMPLE 7 | 0.5 | 200 |

TABLE 2-continued

| | WIDTH OF PIT PORTION (μm) | DEPTH OF PIT PORTION (nm) |
|---|---|---|
| TEST SAMPLE 8 | 0.5 | 200 |
| TEST SAMPLE 9 | 0.5 | 130 |

Then, the dyes A, B and the materials C, D, E were mixed with the following composition ratio to produce a dye containing composition.

A:B:C:D:E=1:1:1.5:0.2:100

Thereafter, the above dye containing composition was coated on the polycarbonate substrate by a spin-coat method to form a reflecting layer, thereby an optical data storage medium being manufactured.

When the reflecting layer was formed, the film thickness $d_{Ln}$ of the reflecting layer in the land portion and the film thickness $d_{gr}$ of the reflecting layer in the pit portion were adjusted by controlling a revolution rate of the spin-coat substrate as shown on the table 3 below.

The table 3 shows together with the above film thicknesses $d_{Ln}$, $d_{gr}$ the distance $d_{sub}$ between the interface of the substrate corresponding to the pit portion and the light reflecting layer of the thus produced optical data storage medium and the interface of the surrounding of the pit portion and the light reflecting layer, the distance $d_{abs}$ between the interface of the light reflecting layer corresponding to the pit portion and the air and the interface of the light reflecting layer corresponding to the surrounding of the pit portion and the air, the real number portion $n_{sub}$ of complex index of refraction of substrate, the real number portion $n_{abs}$ of complex index of refraction of the light reflecting layer and the optical phase difference ΔS calculated from the above-mentioned respective values. Further, measured results of the signal modulation degree are also illustrated on the table 3 and a relationship between the optical phase difference ΔS and the signal modulation degree is illustrated in FIG. 12.

TABLE 3

| | $d_{Ln}$ (nm) | $d_{gi}$ (nm) | $d_{sub}$ (nm) | $d_{abs}$ (mn) | $n_{sub}$ (nm) | $n_{abs}$ (nm) | ΔS (nm) | SIGNAL MODULATION DEGREE |
|---|---|---|---|---|---|---|---|---|
| TEST SAMPLE 6 | 90 | 180 | 200 | 110 | 1.58 | 2.03 | 0.85 | 0.57 |
| TEST SAMPLE 7 | 90 | 120 | 200 | 170 | 1.58 | 2.03 | 0.65 | 0.48 |
| TEST SAMPLE 8 | 90 | 160 | 200 | 130 | 1.58 | 2.03 | 0.45 | 0.4 |
| TEST SAMPLE 9 | 90 | 150 | 130 | 70 | 1.58 | 2.03 | 0.21 | 0.3 |

Figure 12:
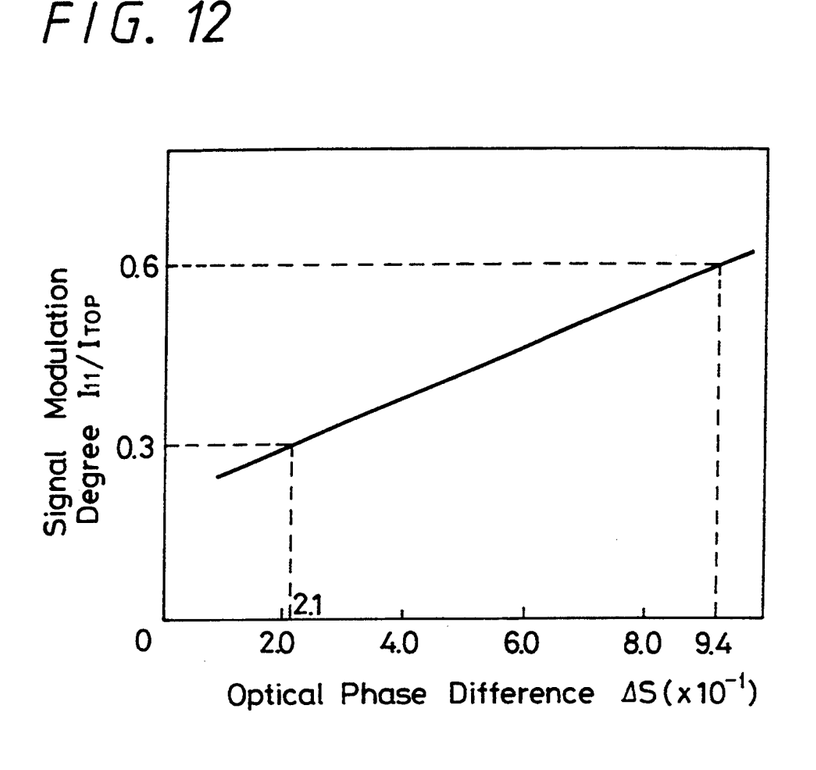
FIG. 12 is a characteristic graph showing a relationship between an optical phase difference $\Delta S$ and a signal modulation degree.

Study of measured results of TABLE 3 and FIG. 12 reveals that the signal modulation degree is increased depending on the optical phase difference ΔS proportionally in the optical data storage medium. From this, it is to be understood that the signal modulation degree can be adjusted to be a desired value by controlling the optical phase difference.

When the signal modulation degree is adjusted to fall in a range of from 0.3 to 0.6 which is the signal modulation degree of the mini-disc (MD), it is sufficient that the optical phase difference ΔS is selected in a range of from 0.21 to 0.94.

EXPERIMENT EXAMPLE 2

In this embodiment, experiments were carried out under the condition that an optical data storage medium is applied to a writable optical disc in which a reflecting layer on which an information signal is recorded is formed on a substrate in which only guide grooves and address code pits are formed.

The dyes A, B and the materials C, D, E were mixed with the following mixing ratio to thereby produce a dye containing composition.

A:B:C:D:E=1:1:1:0.2:100

Then, this dye containing composition was coated on a 1.0-mm thick polycarbonate substrate by the spin-coat method to form a 0.130 μm-thick reflecting layer, thereby an optical data storage medium being manufactured.

Thereafter, an information is written in and/or read out from the thus produced optical data storage medium by the radiation of a laser beam having a wavelength of 780 ±10 nm, thereby measuring the reproduced signal modulation degree.

As a result, it was confirmed that the above optical data storage medium could obtain a signal modulation degree enough to obtain a reproduced signal. In addition, this signal modulation degree was in a range of from 0.3 to 0.6 which is the standardized modulation degree of the mini-disc.

Therefore, it became clear that the optical data storage medium of the present invention could be utilized as the writable optical data storage medium and that a recorded information signal could be reproduced by the recording and reproducing apparatus which can record and reproduce a magneto-optical disc such as the mini-disc or the like.

Furthermore, it became clear that the whole thickness of the above optical data storage medium was thin and could be matched with the standardized thickness, i.e., 1.2 mm of the mini-disc.

As is clear from the foregoing description, according to the present invention, in the optical data storage medium in which the reflecting layer is formed on the substrate in which concave and convex portions corresponding to an information signal are formed in advance or in the optical data storage medium in which the reflecting layer on which the information signal is recorded is formed on the substrate, the dye containing layer having a reflectivity of 15 to 25% is formed as the reflecting layer and the signal modulation degree falls in a range of from 0.3 to 0.6. Therefore, the playback optical data storage medium and the writable optical data storage medium can become reproducible by the recording and reproducing apparatus which can record and reproduce the magneto-optical disc, in particular, the mini-disc.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical data storage medium comprising:
   a substrate in which concave and convex portions corresponding to an information signal are formed; and
   a reflecting layer formed on said substrate, wherein said reflecting layer is formed of a dye containing layer having a reflectivity of 15 to 25% and a signal modulation degree of an information signal recorded by forming said concave and convex portions falls within a range of from 0.3 to 0.6.

2. An optical data storage medium comprising:
   a substrate; and
   a reflecting layer on which an information signal is recorded being formed on said substrate, wherein said reflecting layer is formed of a dye containing layer having a reflectivity of 15 to 25% and a signal modulation degree of an information signal to be recorded falls within a range of from 0.3 to 0.6.

3. The optical data storage medium according to claim 2, wherein a whole thickness of said optical data storage medium is selected in a range of from 1.2 ±0.2 mm.

4. The optical data storage medium according to claim 1 or 2, wherein a real number portion n of complex index of refraction of said reflecting layer is selected so as to satisfy $n \geq 1.84$.

5. The optical data storage medium according to claim 1 or 2, wherein said dye containing layer contains two or more kinds of dyes.

6. The optical data storage medium according to claim 1 or 2, wherein a dye contained in said dye containing layer is cyanine dye and a counter-ion of said cyanine dye has an ionic radius larger than 0.294 nm.

7. The optical data storage medium according to claim 6, wherein said counter-ion of said cyanine dye is any one of ions expressed by chemical formulas (1), (2), (3) and (4)

Chemical formula(1)

$PF_6^-$

Chemical formula (2)

Chemical formula (3)

Chemical formula (4)

8. The optical data storage medium according to claim 1, wherein an optical phase difference ΔS of said reflecting layer between the concave and convex portions obtained by an equation (1) satisfies $0.21 \leq \Delta S \leq 0.94$ $$\Delta S = 2d_{sub}[n_{sub} - n_{abs}(1 - d_{abs}/d_{sub})]/\lambda \quad (1)$$

where
$d_{sub}$: distance between an interface of a substrate and a light reflecting layer corresponding to the concave portion and an interface of a substrate corresponding to the surrounding of said concave portion and the light reflecting layer;

$d_{abs}$: distance between an interface of the light reflecting layer corresponding to the concave portion and air and an interface of the light reflecting layer corresponding to the surrounding of said concave portion and air;

$n_{sub}$: real number portion of complex of index of refraction of said substrate;

$n_{abs}$: real number portion of complex of index of refraction of said light reflecting layer; and $\lambda$: wavelength of a reproduced light.

9. An optical storage medium for use with a recording and reproducing apparatus which can record and reproduce an information signal on a low reflectivity storage medium having a reflectivity of between about 15 to about 25%, said optical storage medium comprising:
   a mini-disc including a substrate in which concave and convex portions corresponding to an information signal may be formed; and
   a reflecting layer formed on said substrate, said reflecting layer including a dye containing layer including a polymer material, a first cyanine dye selected from dyes of the formula:

where $X^-$ is any one of $I^-$, $BF_4^-$, $ClO_4^-$, $PF_6^-$, $[C_6F_5]_4B^-$, $[C_6H_{11}Ph]_4B^-$, $[TRPPh]_4B^-$, and a second dye having the formula:

the dye containing layer having a reflectivity of from about 15 to about 25%, a real number portion of a complex index of refraction of greater than or equal to 1.84, a signal modulation degree $I_{11}/I_{TOP}$ of between about 0.3 to about 0.6, an optical phase difference $\Delta S$ of between about 0.21 to about 0.94, the dye containing layer providing suppression in fluctuations of wavelength dependent reflectivity at wavelengths of about 780 nm ±10 nm and said mini-disc having an overall thickness dimension of about 1.2 nm ±0.2 nm.

* * * * *